Sept. 19, 1939.  W. HOUMÈRE  2,173,275
FABRIC VENETIAN BLIND
Filed Dec. 31, 1937   12 Sheets-Sheet 3
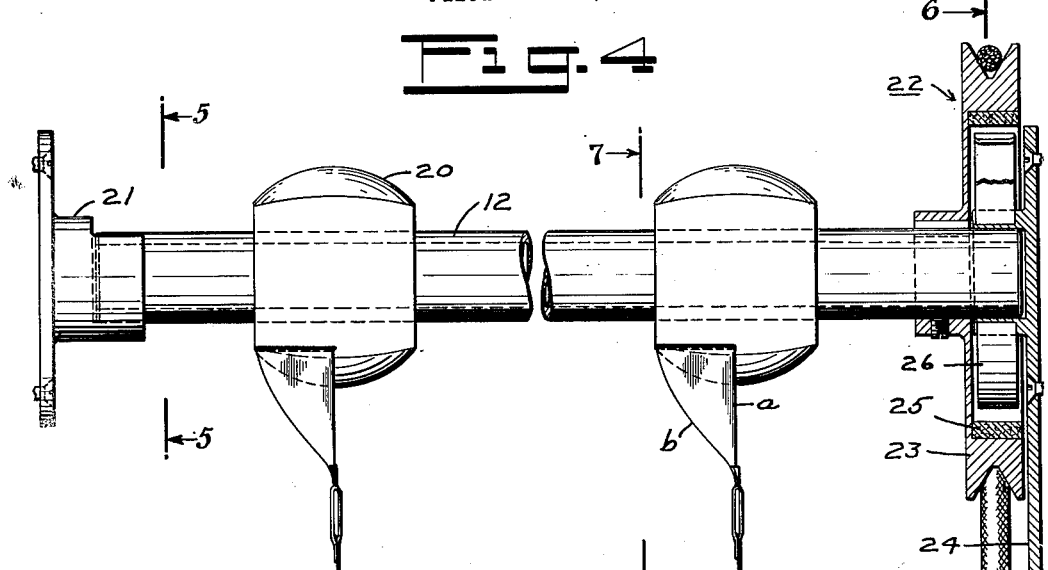
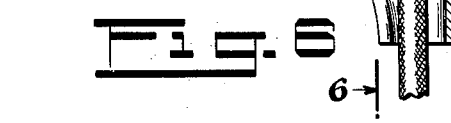
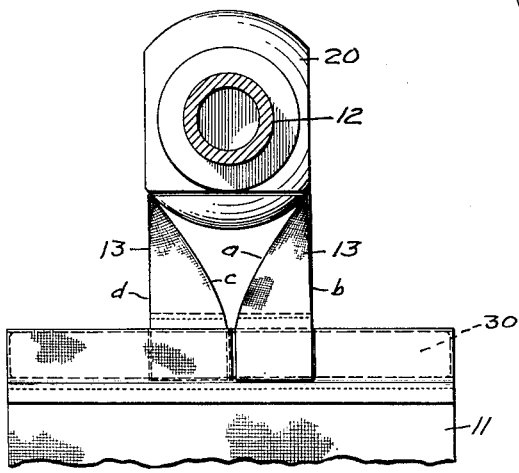
INVENTOR.
Walter Houmère
BY Darby & Darby
ATTORNEYS Sept. 19, 1939.　　　W. HOUMÈRE　　　2,173,275
FABRIC VENETIAN BLIND
Filed Dec. 31, 1937　　12 Sheets-Sheet 4
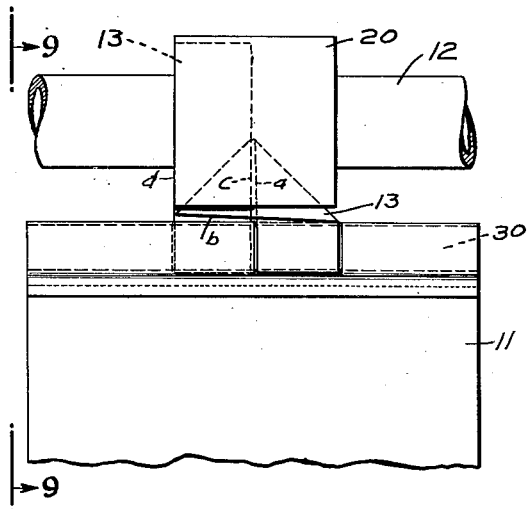
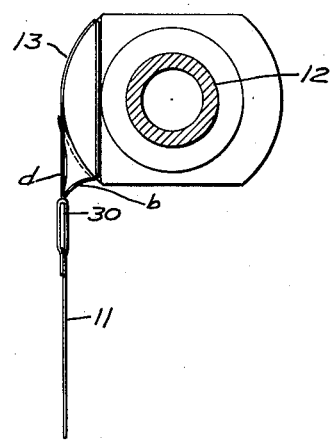
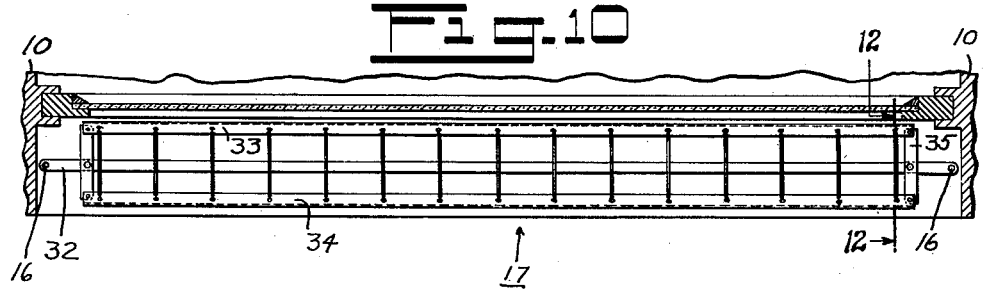
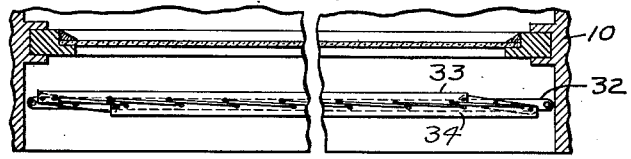
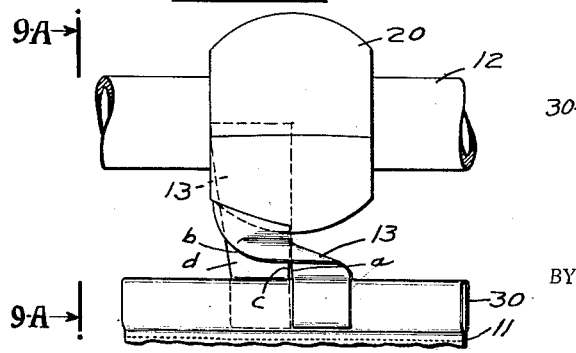
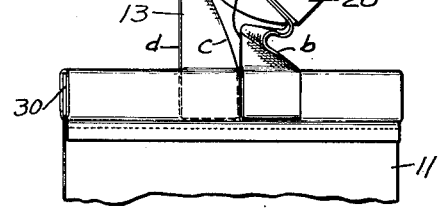
INVENTOR.
Walter Houmère
BY Darby & Darby
ATTORNEYS Sept. 19, 1939.  W. HOUMÈRE  2,173,275
FABRIC VENETIAN BLIND
Filed Dec. 31, 1937   12 Sheets-Sheet 5
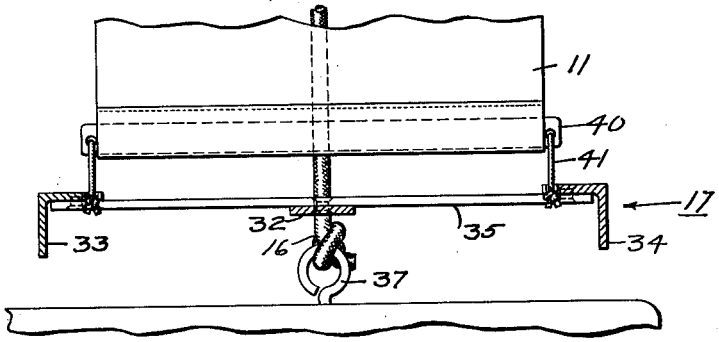
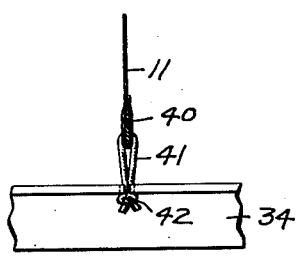 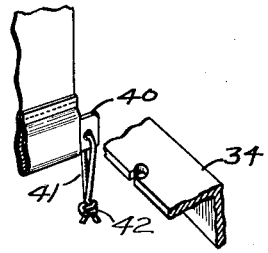
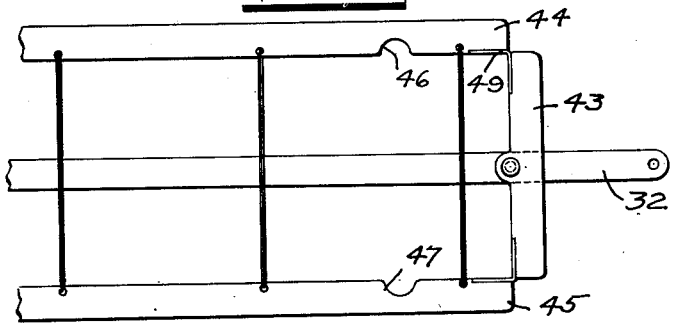
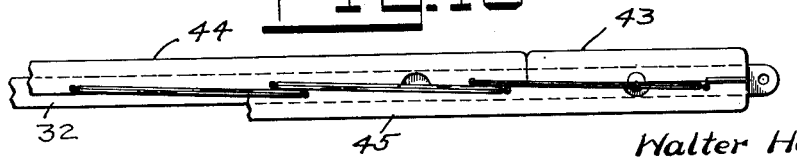
INVENTOR.
Walter Houmère
BY Darby & Darby
ATTORNEYS Sept. 19, 1939. W. HOUMÈRE 2,173,275
FABRIC VENETIAN BLIND
Filed Dec. 31, 1937 12 Sheets-Sheet 6
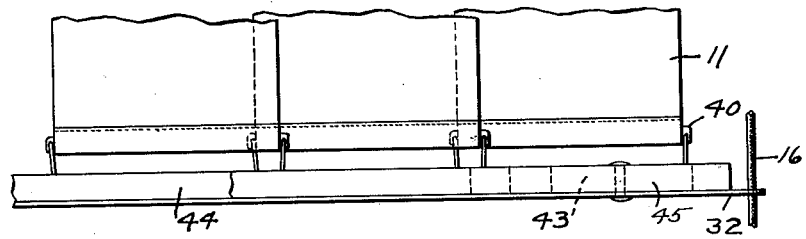
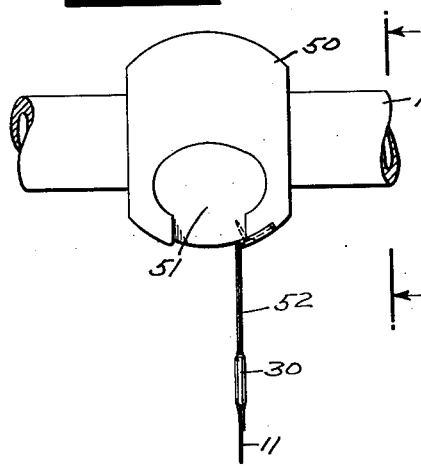
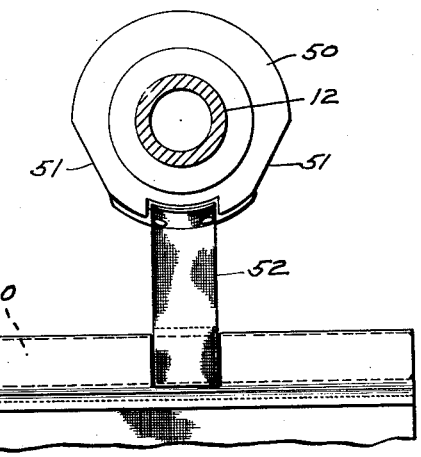
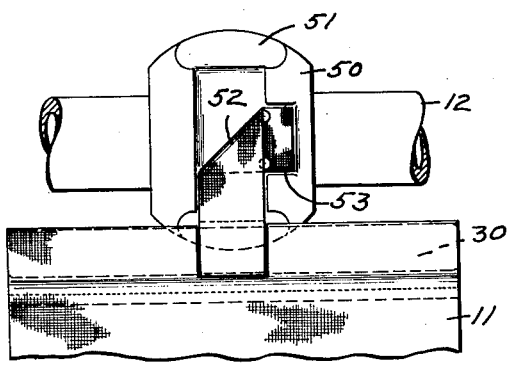
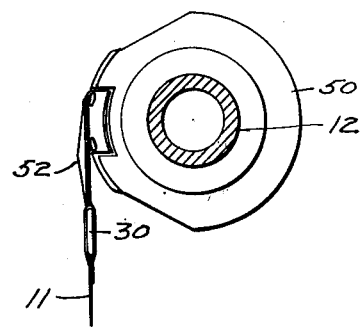
INVENTOR.
Walter Houmère
BY Darby & Darby
ATTORNEYS Sept. 19, 1939.  W. HOUMÈRE  2,173,275
FABRIC VENETIAN BLIND
Filed Dec. 31, 1937  12 Sheets-Sheet 7

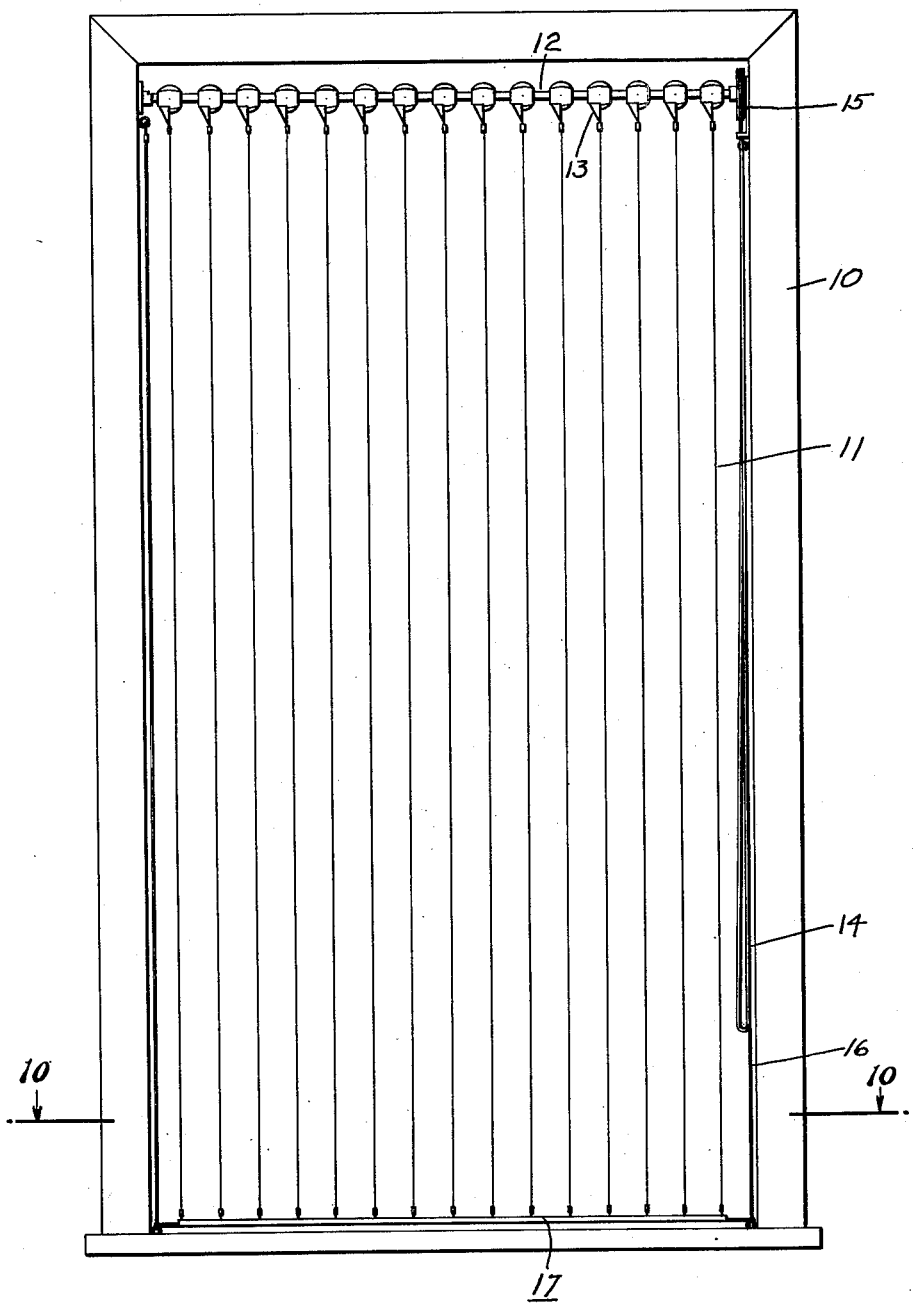

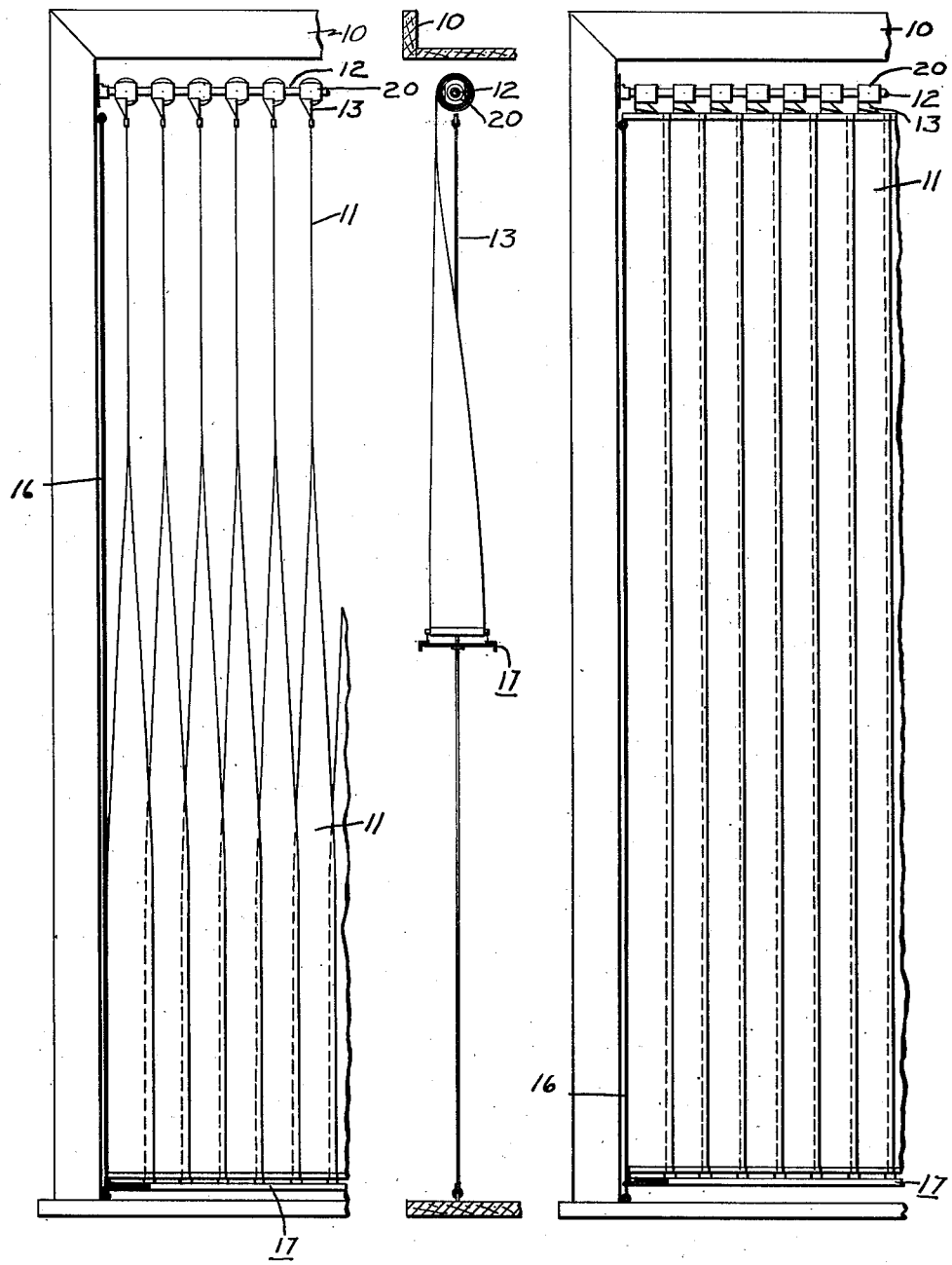

INVENTOR.
Walter Houmère
BY Darby & Darby
ATTORNEYS

Sept. 19, 1939. W. HOUMÈRE 2,173,275
FABRIC VENETIAN BLIND
Filed Dec. 31, 1937 12 Sheets-Sheet 8
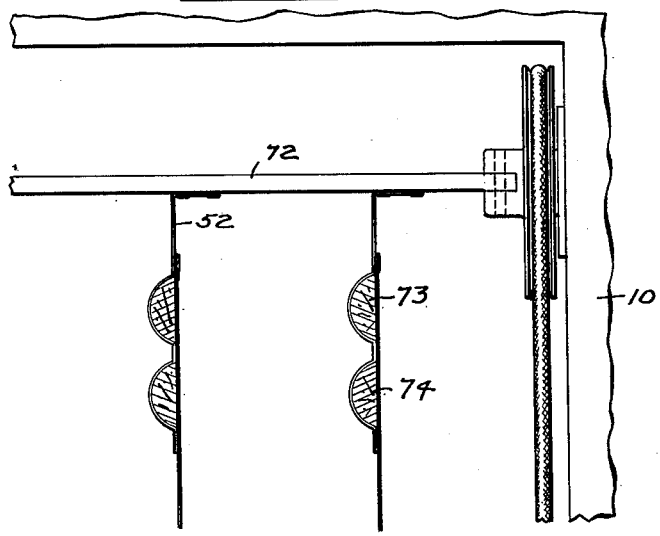
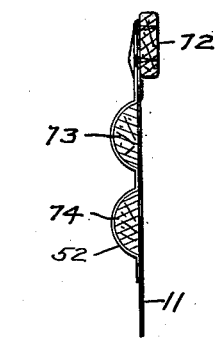
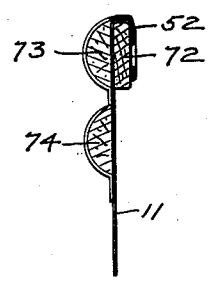
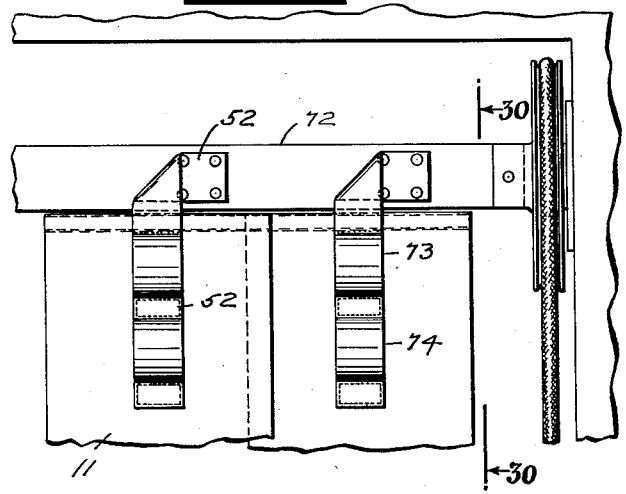
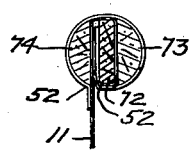
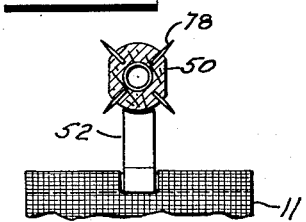
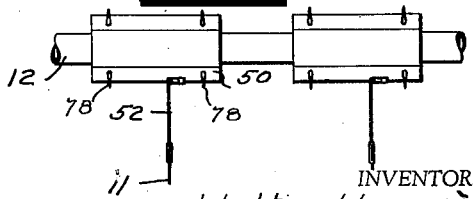
INVENTOR.
Walter Houmère
BY Darby & Darby
ATTORNEYS Sept. 19, 1939.   W. HOUMÈRE   2,173,275
FABRIC VENETIAN BLIND
Filed Dec. 31, 1937   12 Sheets-Sheet 9
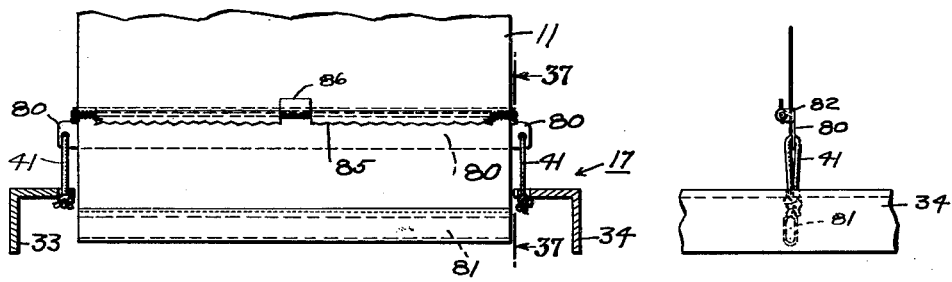
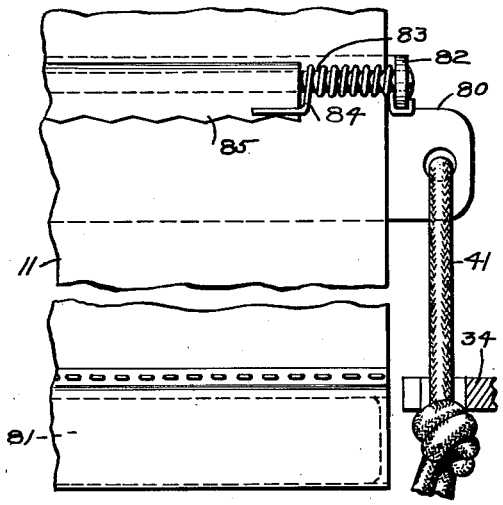
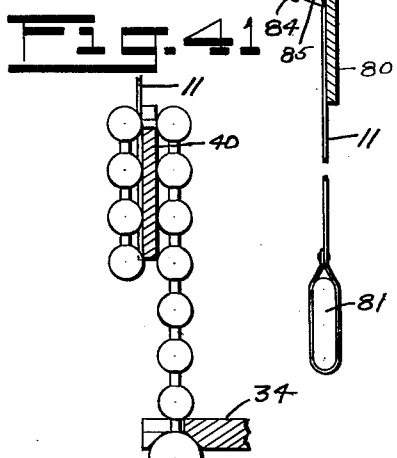
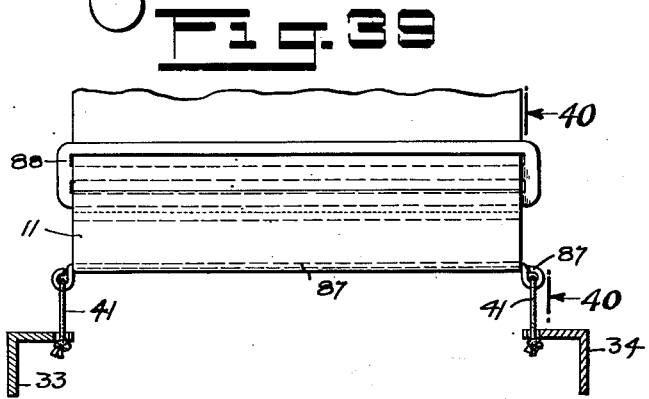
INVENTOR.
Walter Houmère
BY Darby + Darby
ATTORNEYS

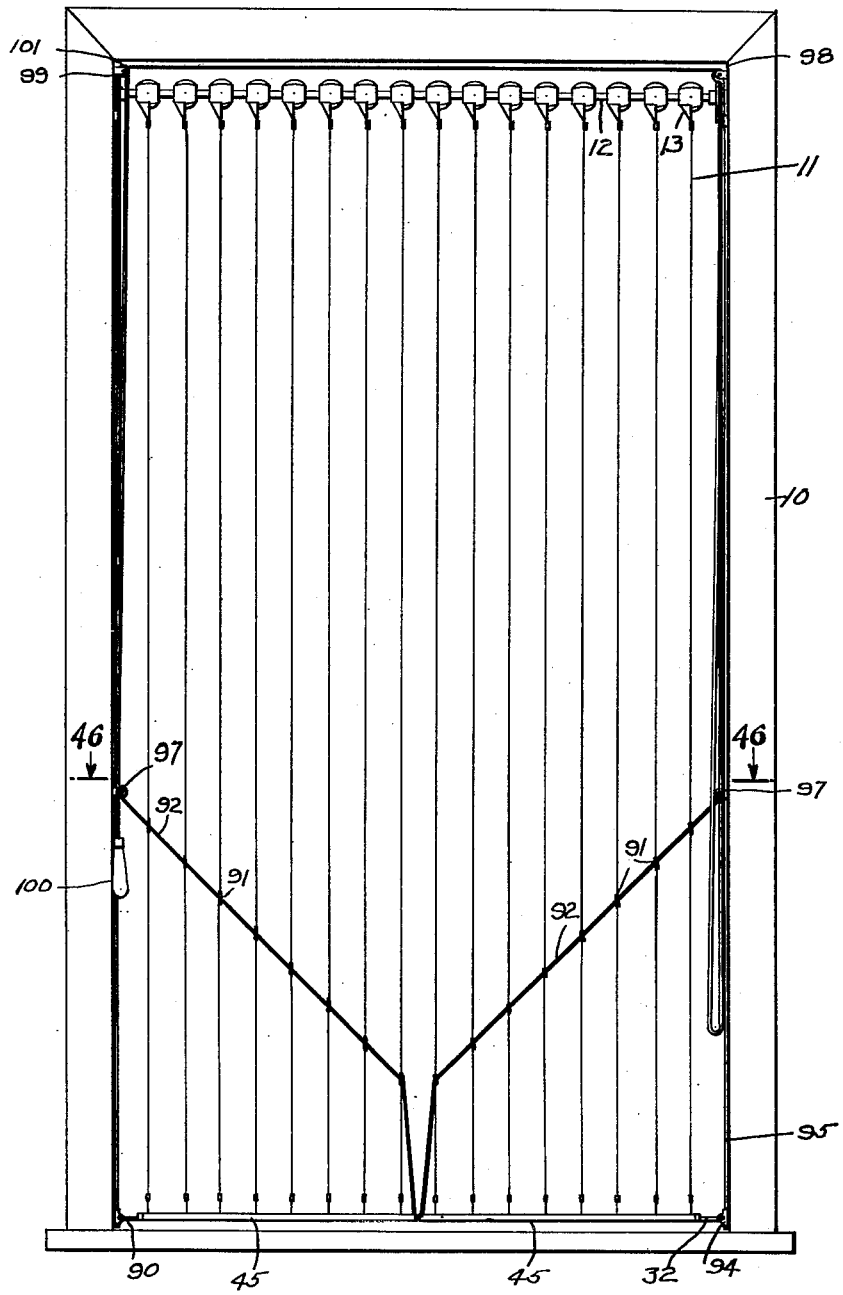

Sept. 19, 1939.  W. HOUMÈRE  2,173,275
FABRIC VENETIAN BLIND
Filed Dec. 31, 1937  12 Sheets-Sheet 11
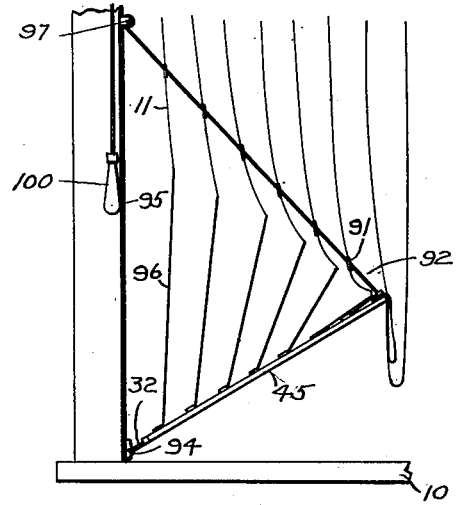
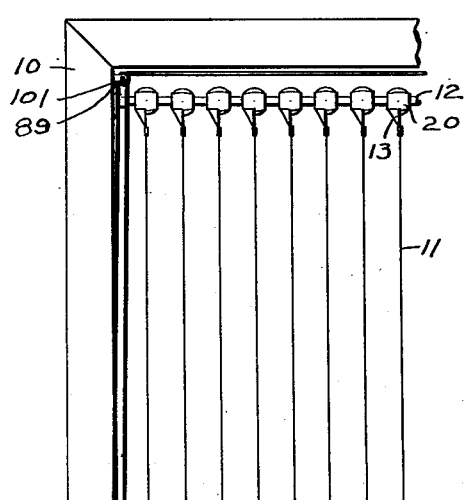
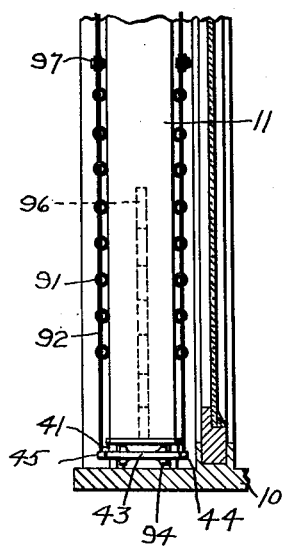
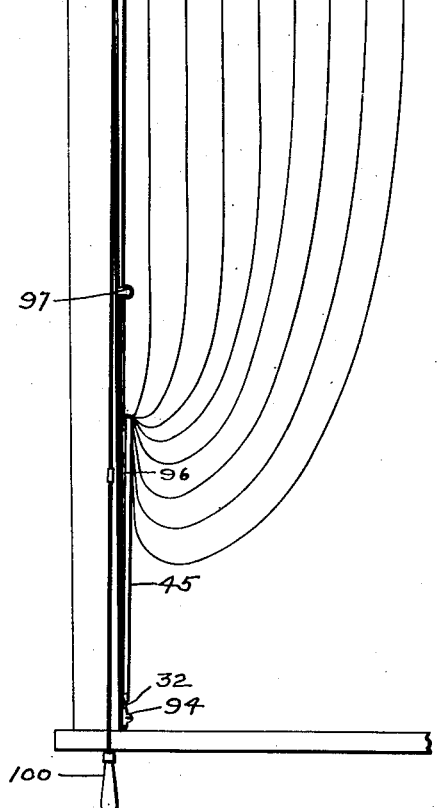
INVENTOR.
Walter Houmère
BY Darby + Darby
ATTORNEYS Sept. 19, 1939. W. HOUMÈRE 2,173,275
FABRIC VENETIAN BLIND
Filed Dec. 31, 1937 12 Sheets—Sheet 12
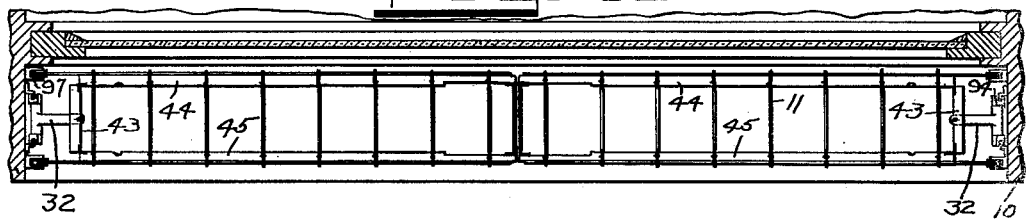
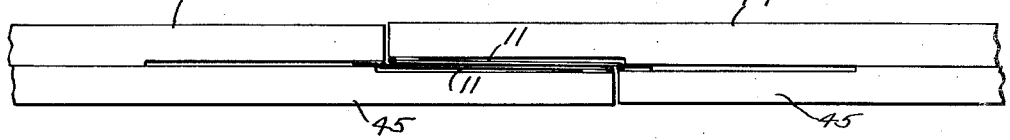
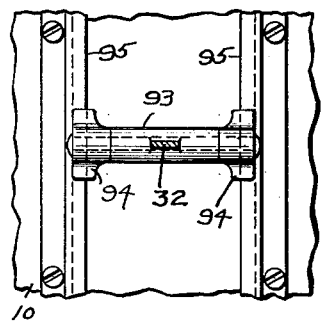
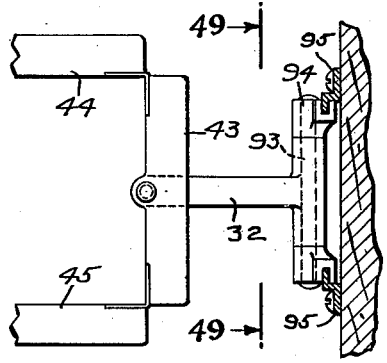
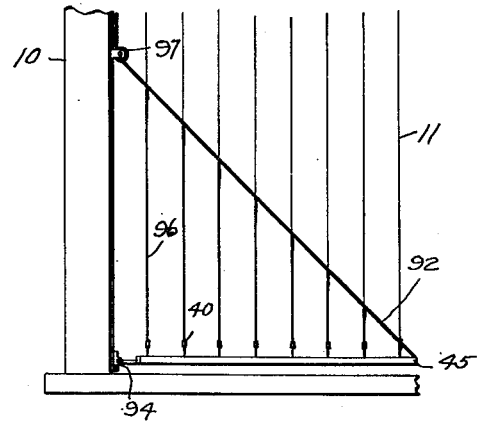
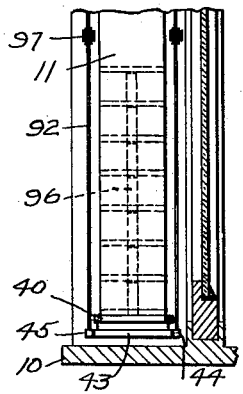
INVENTOR.
Walter Houmère
BY Darby + Darby
ATTORNEYS Patented Sept. 19, 1939

2,173,275

UNITED STATES PATENT OFFICE 2,173,275

FABRIC VENETIAN BLIND

Walter Houmère, New York, N. Y.

Application December 31, 1937, Serial No. 182,729

27 Claims. (Cl. 156—17)

The present invention relates to Venetian blind structures and particularly to such a blind in which the closable members are formed of fabric strips.

More particularly the invention relates to a blind in which the strips rotate about vertical axes and which blind may be rolled up in the same manner as the ordinary shade. The rotation of the blind strips about their axes and the rolling up of the blind when closed are controlled by a single control mechanism, thus making the structure extremely simple and effective.

It is an object of the invention to provide a Venetian blind structure in which fabric strips may be utilized in place of the wooden slats now customary. This fabric may be silk ribbon, oiled silk, "Tontine", lace, or any one of a variety of materials, any of which is highly decorative and desirable in a structure of this type.

Another object of the invention is to provide a Venetian blind structure in which the strips extend vertically and may be rotated about their vertical axes for opening and closing the blind, this rotation being controlled in a very simple manner by the use of a tape which connects the top of the strip with a rotatable shaft.

It is a further object of the invention to provide a Venetian blind which may be rolled on a rotatable shaft, or on spools on the shaft, to entirely remove the blind from the field of view and to supply a substitute for the ordinary shade, which is in common use.

It is a still further object of the invention to provide various accessories for guiding the blind strips into position upon the shaft when the blind is being raised and lowered and to adapt these accessories to the use of various fabrics.

It is also an object of the invention to provide a structure in which a flat shaft is used, the blind strips carrying semi-cylindrical members which cooperate with the flat shaft to form cylindrical surfaces upon which the blind strips are thereafter rolled.

It is a further object of the invention to provide a Venetian blind of the type described above arranged so that the strips on the two sides will be raised about a pivot to form a drapery effect which will further enhance the decorative value of the structure.

Other objects and features of the invention will appear when the following description is considered in connection with the appended drawings, in which Figure 1 is a front elevation of the blind of my invention in place in a window casing. In this view the blind is shown fully lowered and open at both top and bottom;

Figure 2 is a fragmentary front elevation of the blind installed in a window casing showing the blind lowered and fully open at the top, but entirely closed at the bottom;

Figure 2A is a cross-sectional view of the blind showing the blind partially lowered and open at the bottom while closed at the top;

Figure 3 is a front elevation generally similar to Figure 1 but showing the blind closed at both top and bottom;

Figure 4 is a front elevation partially in section showing the mode of construction of the rotatable shaft on which the blind is adapted to be rolled, and also the mode of attachment of the tapes for supporting the blind strips. This view likewise shows the construction of a friction holding member for assuring that the shaft will remain in any position to which it is rotated;

Figure 5 is a vertical cross-section on the plane of the line 5—5 of Fig. 4, showing a suitable form of supporting bracket for the shaft;

Figure 6 is a cross-sectional view on the plane of the line 6—6 of Fig. 4 showing the construction of the friction holding member and the manner of mounting a cord thereon, which cord is used to cause rotation of the shaft;

Figure 7 is a cross-sectional view on the plane of the line 7—7 of Figure 4 showing particularly one manner of supporting a blind strip. In this view the supporting member is a double tape which is mounted in a slot on a spool which is in turn mounted on the shaft;

Figure 8 is a fragmentary front elevation generally similar to Fig. 4 showing the position of one of the blind strips after the shaft has been rotated through a ninety degree angle. This view, likewise, shows folds in the tape which occur during such rotation, and which cause the blind strips to assume a position parallel to the plane of the window;

Figure 8A is a view generally similar to Figs. 4 and 8 but showing the position of the blind strip and the folds in the tape when the shaft has been rotated through an angle of forty-five degrees;

Figure 9 is a vertical, cross-sectional view taken on the plane of the line 9—9 of Fig. 8, showing the formation of the tapes when the shaft has been rotated through a ninety degree angle;

Figure 9A is a vertical, cross-sectional view on the plane of the line 9A—9A of Fig. 8A, illustrating in detail the folds and formation of the tape when the shaft has been rotated through a forty-five degree angle;

Figure 10 is a horizontal, cross-sectional view taken near the bottom of the shade showing the construction of the control mechanism for opening and closing the blind at the bottom thereof. In this view the mechanism is shown in position to hold the blind open. This view is on the plane of the line 10—10 of Fig. 1;

Figure 11 is a broken sectional view similar to Fig. 10 but showing the lower blind control mechanism in closed position, as in Fig. 3;

Figure 12 is a fragmentary, vertical, cross-section on the line 12—12 of Fig. 10 showing details of the lower blind closing mechanism;

Figures 13 and 14 are views showing details of the construction of Fig. 12;

Figure 15 is a view showing a modification of the mechanism of Fig. 10;

Figure 16 is a view similar to Fig. 15 but showing the mechanism in blind closing position.

Figure 17 is a fragmentary front elevation showing the blind closing mechanism of Fig. 16 in closed position and showing likewise the appearance of the blind strips at that time;

Figure 18 is a fragmentary front elevation of the rotatable shaft showing a modification of this structure utilized when a single tape replaces the double tape of the earlier figures;

Figure 19 is a fragmentary cross-sectional view on the plane of the line 19—19 of Fig. 18;

Figure 20 is a view similar to Fig. 18 showing the conformation of the single tape when the shaft has been rotated through a ninety degree angle.

Figure 22:
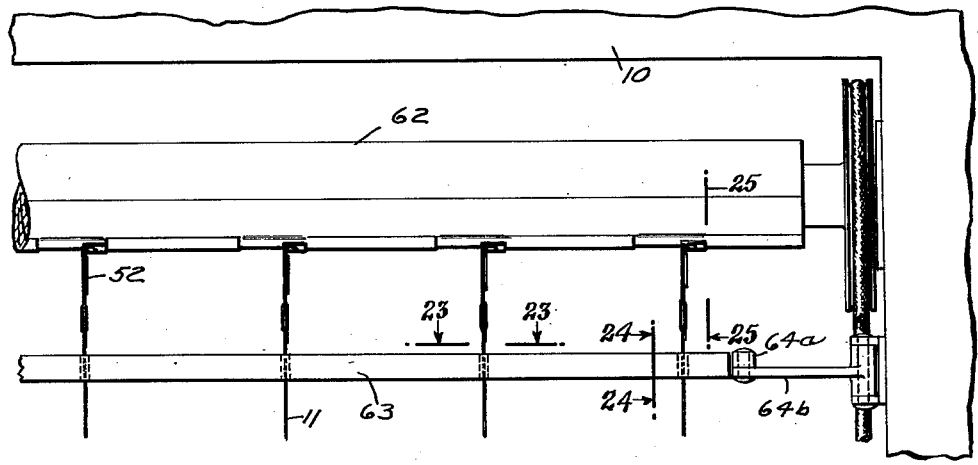
Figure 23:
Figure 24:
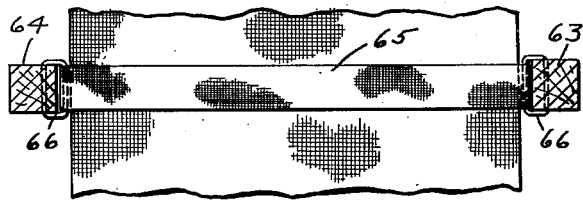
Figure 25:
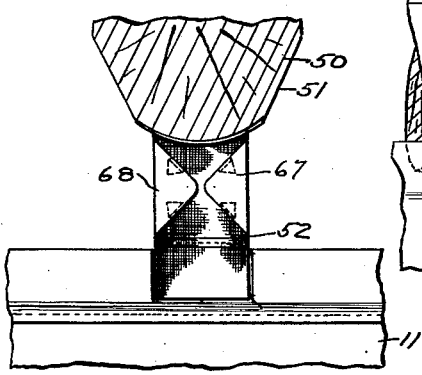
Figures 26, 27:
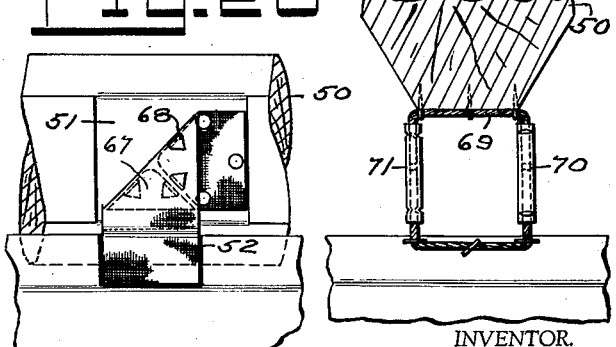

Figure 21 is a broken, cross-sectional view taken along line 21—21 of Fig. 20;

Figure 22 is a fragmentary front elevation of the upper portion of the window casing with the blind mechanism installed therein showing a modified form of shaft which is preferable when a comparatively rigid material such as "Tontine" is used. This view also shows a guiding mechanism for guiding the strips of material onto the shaft and preventing sidewise slippage and twisting thereof as the material piles up;

Figure 23 is a broken, horizontal section on the plane of the line 23—23 of Fig. 22 showing the double tape length between the portions of which blind strips pass and by which the blind strips are guided;

Figure 24 is a fragmentary, vertical, cross-section on the plane of the line 24—24 of Fig. 22 showing the mode of attaching the guiding tapes to the cross bars of the guiding mechanism;

Figure 25 is a fragmentary cross-section on the plane of the line 25—25 of Fig. 22 showing reinforcing members attached to the supporting tape;

Figure 26 is a front elevation of the portion of the mechanism shown in Fig. 25 showing the position which the tape assumes when the shaft is rotated through a ninety degree angle;

Figure 27 is a view similar to Fig. 25 showing a manner of supporting the blind strip by means of a cord in place of a tape, the cord being reinforced with stiffening beading at certain points thereon;

Figure 28 is a fragmentary front elevation of a modified form of the blind mechanism in which a flat shaft is utilized and each blind strip has placed thereon two semicylindrical blocks which are adapted to cooperate with the shaft to form a cylindrical surface on which the blind strips are wound;

Figure 29 is a view similar to Fig. 28 showing the shaft rotated through a ninety degree angle and the blind closed due to the formation of folds in the supporting tapes;

Figure 30 is a cross-sectional view on the line 30—30 of Fig. 29;

Figure 31 is a view similar to Fig. 30, showing the position of the cylindrical blocks when the shaft is rotated through an additional one hundred eighty degree angle;

Figure 32 is another view similar to Figs. 30 and 31 showing the position of the cylindrical blocks when the shaft has been rotated through a still further one hundred eighty degree angle;

Figure 33 is a cross-sectional view of the shaft and blind showing a modification of the winding spools which is used in case the blind strips are to be made of lace, or other similar material;

Figure 34 is a fragmentary front elevation of the shaft and spools of Fig. 33;

Figure 35 is a vertical, cross-sectional view of the lower portion of the blind showing mechanism for adjusting the length of the blind strip;

Figure 36 is a fragmentary front view of the mechanism of Fig. 35;

Figure 37 is a vertical, cross-sectional view taken on the plane of the line 37—37 of Fig. 35, showing additional details of the adjusting mechanism;

Figure 38 is a fragmentary view on an enlarged scale, showing details of the mechanism of Fig. 35;

Figure 39 is a fragmentary, vertical, cross-section of the lower section of the blind showing a modified form of adjusting device;

Figure 40 is a cross-sectional view of the adjusting device of Fig. 39 taken on the plane of the line 40—40 of that figure;

Figure 41 is a showing of another form of adjusting device generally similar to those of Figs. 35 and 39;

Figure 42 is a front elevation of a window casing with the blind installed therein, showing particularly a form of the blind in which the lower control mechanism is made in two halves, each of which is pivotal about its side so that it may be raised to form a draped blind of enhanced decorative quality;

Figure 43 is a fragmentary front elevation showing the draped blind when the pivoted member has been operated through a small angle;

Figure 44 is a fragmentary front elevation of a window casing and installed blind showing the appearance of the blind when the pivoted member has been raised to its fullest extent. It is to be noted that in this position the blind strips fall in sweeping curves and are gathered at the upper end of the pivoted member;

Figure 45 is a vertical, cross-sectional view of the window frame and blind showing the position of the control cords which cooperate with the pivoted member to produce the results shown in Fig. 44;

Figure 46 is a horizontal, cross-sectional view of the window frame and blind showing the construction of the lower control mechanism and the mode of pivoting the halves of that control mechanism on members supported from the sides of the window casing. In this view the control mechanism is shown in open position;

Figure 47 is a fragmentary front elevation of the mechanism of Fig. 46 showing how the control members on either side operate upon and fit into the members of the other side when operated to close the blind;

Figure 48 is an enlarged view of a portion of the lower control mechanism showing the arrangement of the supporting member upon tracks fixed to the side member of the window frame and adapted to guide the control member in its upward and downward movement;

Figure 49 is a cross-section taken on the plane of the line 49—49 of Fig. 48 showing additional details of the track and the mode of installing the supporting member thereon;

Figure 50 is a fragmentary front elevation similar to Fig. 43 but showing the mechanism for causing the draping of the blind in its lowest position; and Figure 51 is a vertical cross-sectional view showing the manner of attaching the controlling cords to the pivoted control member of Fig. 50.

In general the invention comprises a blind structure which is formed from fabric strips 11 which are suspended by means of tapes 13 from a shaft 12, which shaft is rotatably mounted in brackets fixed to the upper side portions of a window casing 10. Suspended from the strips 11 is a lower control member designated 17 which acts as a weight to keep the strips taut and serves also to rotate the lower portion of the strips about their vertical axes. This control member is guided for up and down movement by means of guide cords 16 which are fixed to the side members of the window frame. While the tapes 13 are shown and described as separate from the strips 11, it will be obvious that they may be elongations of those strips.

In the first form of my invention a double tape is utilized to suspend the strips 11 from the shaft 12 or from spools 20 on that shaft, as the case may be. In this form, and in fact in all forms, a means is provided to assure that the shaft will not move from the position in which it is set. This means comprises a friction holding or brake device generally designated 22, one element of which is fixed to the window casing and a second element of which is fixed to the shaft 12. The appearance of this brake member as assembled on the shaft is shown in Fig. 4, and the details of this construction are better illustrated in Fig. 6. The fixed member of the brake comprises the bracket 24 which is arranged to be screwed to the window casing and which has protruding therefrom a hub in which the spring members 26 are fastened. Fixed to the shaft 12 is a drum 23 having a knurled V-shaped groove in the outer periphery thereof, which groove is adapted to fit a cord which lies therein, and which cord is used to control the rotation of the drum and shaft. Fastened to the inner periphery of the drum 23 is a leather facing 25 against which the springs 26 bear. It will be seen that due to the spring action against this leather facing the shaft remains in any position to which it is rotated by means of the cord. The lower end of the bracket 24 has projecting ears which are bent around and form guides for an operating cord.

The opposite end of the shaft 12 is supported in a bracket 21, Fig. 5, which bracket is fixed to the opposite side of the window casing so that the shaft is freely rotatable therein. This bracket is so constructed as to make it possible to remove the shaft 12 and drum 23 without disturbing either the bracket 21 or the opposite bracket 24. This of course provides for ease of installation since the brackets may be first installed and the shaft thereafter slipped into place. Adjustably spaced along the shaft 12 are spools 20 on which the material is adapted to roll as the blind is raised. These spools have curved or inclined surfaces so that the centers are higher than the edges, and due to this construction and the spacing of the spools provision is made for the overlapping edges of the blind strips to roll up without tending to have an eccentric bearing and to wind unevenly. Of course the spools may be made integral with the shaft and the spools may abut each other whether made separately or integrally.

As shown in Fig. 4 and also in Fig. 7, each roller 20 has a slot therein into which is inserted the tape 13, the ends of the tape being then twisted around and fastened to the upper edge of a strip 11. While the slit arrangement is convenient, it will be obvious that it would be possible to use two tapes and fasten each one in position on the spool, and although the slit arrangement will be described, there is no intention to limit the construction to that form. Tape 13 may be fastened to the strip 11 in any convenient manner. As shown, the tape is fastened to the strip by means of a stiffening member 30 which extends through a pocket formed in the strip and through similar pockets formed in the ends of the tape. The ends of the tape are fastened to the strip immediately adjacent to and on either side of the center thereof. This construction is shown in Fig. 7.

As shown in Fig. 4 the shaft is in position to produce the condition shown in Fig. 1, that is the blind is fully lowered and the blind strips are perpendicular to the plane of the window or to a vertical plane, including the axis of the shaft, or in other words the blind is opened. When it is desired to close the blind the lower control member 17, which will be hereinafter described, is first operated to cause the strips 11 to lie substantially parallel to the plane of the window at their bases, and thereafter the shaft 12 is rotated by means of the cord to cause the upper portions of the strips 11 to assume a position likewise parallel to the plane of the window. When the shaft 12 has been rotated through a ninety degree angle the strips 11 will assume this parallel position, the double tape 13 taking the form shown in Figs. 8 and 9. During this rotation the tape 13 will assume various conformations, and when the shaft has been rotated through a forty-five degree angle the conformation shown in Figs. 8A and 9 will obtain. It is to be noted that there are two 45° folds in the tape at this time. The dimensions of the tape must be such that the distance from the point of attachment on the spool to the point of attachment on the strip is not less than twice the width plus twice the thickness of the tape. It is preferable that the length of a 90° arc of the spool at its center equal this distance; though it may be less it can never be greater.

Referring now to Figs. 7 to 9A, the edges of the double tape 13 have been lettered *a*, *b*, *c* and *d* throughout in order to show exactly what conformation the tape takes in the various positions of the shaft. Thus in Figs. 4 and 7 the width of the tape where it passes through the roller is parallel to the axis of the shaft, and the width of the tape at the lower edge thereof at the place of joinder with the strip is parallel to the strip and perpendicular to the plane of the window. When the shaft has been rotated forty-five degrees the tape takes the position shown in Fig. 8A, and due to the forming of folds in the tape the strip 11 rotates clockwise from the position shown in Fig. 4 and lies at an angle of forty-five degrees to the plane of the window. As the shaft rotation continues the tape 13 is folded in the form shown in Figs. 8 and 9, and the strip 11 under control of the tape takes a position parallel to the plane of the window.

It will be seen from the above that the first quarter rotation of the shaft 12 causes the strips 11 to rotate about their own axes from fully open to fully closed position, and that in this instance that rotation is in a clockwise direction bringing the strips in position to be rolled on the spools starting from the rear thereof, which is perhaps the generally desirable arrangement. It will also be obvious however that if the shaft had been rotated in the opposite direction the strips would have rotated counter-clockwise to their fully closed position, and if rotation of the shaft were continued in the same direction the strips would roll up on the spools from the front thereof.

It would be possible to achieve this turning of the strips about their axes and rolling of the strips on the shaft without any control member at the bottom of the strips, but the construction would be unsatisfactory because if the window were opened the strips could blow about and because they are not under definite control at the lower edge. For this reason the lower control member 17 is provided. This control member comprises a bar 32, Fig. 10, which extends between the cords 16 fixed to the sides of the window casing as above described. Fastened near each end of this bar is a cross member 35 pivoted at its center to the bar. The cross members 35 are joined at their ends by bars 33 and 34, the cross members 35 being sufficiently long so that the strips 11 may extend between these two bars when the blind is in its fully opened position. Extending between the bars 34 and 35 are guides through which the strips extend so that movement of the parallelogram formed by bars 33, 34 and 35 will cause rotation of each strip about its axis.

As will be seen by reference to Fig. 10, the parallelogram may be closed upon itself so that bars 33 and 34 come together by moving the forward bar 34 either to the right or to the left, in one instance causing the strips 11 to rotate clockwise, and in the other instance counterclockwise.

In Fig. 11 the parallelogram is shown in its closed position. In this figure the bar 34 has been moved to the right and counterclockwise rotation of the strips 11 has resulted. Operation of the control member 17 affects only the lower portion of the strips 11 so that if this member is operated without rotating the shaft 12, the condition illustrated in Fig. 2 results, that is, the blind is closed at the bottom and open at the top. Operation of both member 17 and the shaft 12, the latter through a ninety degree angle, results in a slight raising of all of the strips, and results in the condition shown in Fig. 3, in which the blind is closed at both top and bottom.

As will be obvious from a consideration of the construction, it is entirely possible to substitute a shaft similar to shaft 12 for the lower control member, this shaft being arranged to operate through a ninety degree arc only in order to rotate the lower portion of the strips 11 each about its own axis.

The lower control member 17 may be formed in any of a variety of manners. In the form shown in Fig. 12 the bars 33 and 34 are angle members and the bars 32 and 35 are made from flat stock. The strips are fastened to the bars 33 and 34 by means of a rod 40 which extends through a loop formed in the strip 11, and which is held downwardly by means of elastic cords 41.

As shown in Figs. 13 and 14, each bar 34 or 35 has a number of spaced holes therein, which holes are joined by slots to the inner edges of the bar so that the elastic cord 41 may be inserted through the slot into the hole and will be prevented from pulling through the hole by the knot 42 tied in the ends of the cord. As will be obvious these elastic cords assure the proper adjustment and horizontal positions of the lower control member even though the strips vary slightly in length.

Figs. 15, 16 and 17 illustrate a modification of the lower control member in which bars 44 and 45 are substituted for the bars 33 and 34 and bars 43 are substituted for the bars 35. These bars are of wood and are joined at their ends by means of the fabric strips or hinge pieces 49. This arrangement provides for a more finished appearance since the cross-bars 43 are of the same thickness as and align with the front member 45. In order that the two bars 44 and 45 may come together the notches 46 and 47 are provided, which notches permit entrance of the pivot pin into either bar as required. In this construction the same hole and slot arrangement as shown in Fig. 14 is used to restrain the elastic cord 41, bars 44 and 45 having a channel along the bottom edge in which the knots 42 seat so that they are not visible. As seen by reference to Fig. 17, when the blind is closed so that the strips 11 overlap one another the lower control member of the form just described appears to be a continuous bar and the blind is thus given a more finished appearance.

The foregoing has described a structure utilizing a double tape for supporting the strips from the spools. In another form of my invention I utilize a single tape for supporting the strips. Referring to Fig. 18, the shaft 12 is shown provided with spools 50, to each of which there is fastened a single tape 52 in such manner that the edges of the tape are substantially parallel to the axis of the shaft. The center lines of these tapes all lie in the same plane through the shaft axis. The spools 50 are raised at their centers to provide for the overlap of the strips and are cut away at 51 to form flat surfaces on which the stiffening members 50 may lie so that the resultant effect is that of a full spool. Tape 52 is stapled or otherwise fastened to the spool in a depression 51 so that the surface of the tape is flush with the surface of the spool.

In Fig. 19 the tape 52 and the mode of mounting it in the depression in the spool 50 is clearly shown. As the shaft 12 is revolved the tape 52 will form a forty-five degree fold, which fold will lie to the left of the depression 53 in the spool, causing the center lines of the tape to shift slightly to the left in Fig. 20. The depression 51 connects the two flat sides previously mentioned so that the tape when thus folded over lies in a depression with its outer surface substantially flush with the surface of the spool. As the tape forms this forty-five degree bend it causes the strip 11 to rotate about its vertical axis through a ninety degree angle, thus closing the blind, as is clearly shown in Figs. 20 and 21. This single tape arrangement, while different in construction, is the same in principle as the double tape arrangement before described and serves the same function as that double tape, namely to cause rotation of the associated strip about its vertical axis through ninety degrees as the shaft and spool rotate through a corresponding ninety degree angle. The curved outer surface of the spool 50 of Figs. 18 to 21 is adapted to the use of relatively flexible material, as for example oiled silk or silk ribbon, and the space between the spools 50, as well as the rounded surface of the spools, provides space for the overlapping edges of the strips 11 so that when the blind is entirely rolled up the strips 11 form a substantially continuous cylindrical surface. As stated above, the spools may meet and may be made integral with the shaft.

In Fig. 22 there is shown a form of the invention which is particularly adapted to the use of relatively rigid material for the blind strips 11. One example of such a material is "Tontine". Any other common shade material of like type is equally usable. In this form the shaft 12 supports a substantially cylindrical roller 62 which extends from one side of the window to the other, this roller being provided, however, with flat surfaces to accommodate the stiffening members 30 as the blind is rolled upon the roller. Since the overlapping of the various strips 11 of this rigid material builds up much more rapidly at one side of each strip there is a tendency for the strips to slip sideways and prevent proper raising of the blind. For this reason a guiding member or parallelogram is provided, this member being generally similar to the lower control member already described but being supported from the window casing. The bars 63 and 64 are joined together at their ends by cross-bars 64ª which are pivoted on supports 64ᵇ fastened to the window casing. At spaced points along the bars loops of fabric or other suitable material 65 are provided, these loops extending from bar 63 to bar 64 as shown in Fig. 23. The loops may be fastened to the bars by means of the wire staples 66, Fig. 24, or in any other suitable manner. It will be seen that as the shaft rotates through the first ninety degrees and the strips 11 likewise rotate, the strips, being of rigid material, will cause the parallelogram to close and when in its closed position the loops 65 will bear against the edges of the strips so that the strips are forced to wind evenly upon the roller 62.

In order to assure the proper folding of the tape 52 it is at times desirable to reinforce the tape to exert greater turning power on the strip below. This is particularly desirable when comparatively rigid material is used for the strip. In this case triangular stiffening members such as shown in Fig. 25 and designated by the reference characters 67 and 68 are used. These stiffening members may be of metal, Celluloid, fibre, or other similar material. As will be seen by reference to Fig. 26, when the shaft is rotated the members 67 and 68 define a forty-five degree fold in the tape 52 and prevent any tearing of the tape which might possibly otherwise occur.

The tape structure described above is the most convenient method of supporting the strips 11 and of causing their rotation, but in order to illustrate the principle of the invention Fig. 27 is supplied, this figure showing the tape replaced by cords 69, which cords depend from the shaft 62 and are stapled to the upper edge of the strip 11. Although shown as a continuous cord, it will be obvious that the cords 69 might be separate. Each side of the cord 69 has fastened thereto a metallic beading or other stiffening device which replaces the center portion of the tape. It will be seen that as the shaft is rotated clockwise through a ninety degree angle the left hand cord rises while the right hand cord is lowered. As this occurs the strip 11 is caused to rotate about its axis and when the shaft is rotated through its full ninety degrees the left hand cord will remain in a vertical position whereas the right hand cord will have assumed a horizontal position with the lower end of the beading lying above the upper end of the beading on the left hand cord.

In Figs. 28 to 32 there is shown a modification of the construction in which a flat bar 72 replaces the shaft 12. In this instance generally semi-cylindrical blocks 73 and 74 are fastened to the strips 11 and spaced apart a distance equal to the thickness of the bar 72. As will be seen by reference to Figs. 28 and 29, these blocks are inserted in pockets formed between the extended tape 52 and the strips 11. When the bar 72 is rotated through its first ninety degrees the strips 11 are likewise caused to rotate through ninety degrees, causing the blind to close, the elements then being in the position shown in Fig. 29. On further rotation of the bar 72 the upper cylindrical block 73 will move upwardly until the flat side thereof lies against the side of the bar 72, forming a semi-cylindrical roller. Upon still further rotation of the shaft the second block 74 will rise to a position so that its flat side lies against the other side of the bar 72 and a complete cylindrical roller will be formed on which the associated strip 11 will thereafter be wound.

While this form of the invention is suitable for many materials, it is particularly adapted to thin material of relatively great strength, such as silk ribbon. It is not particularly adapted to the use of some other materials, such as oiled silks, because it requires sewing the tape directly to the material and oiled silk is apt to rip and tear under such conditions.

It may at times be desirable to utilize a flat shaft having curved strips along the edges thereof, or to describe this in a different manner, a shaft formed by passing parallel planes through the shaft of Fig. 1 on opposite sides of the axis and disregarding the outer portions. This shape of shaft lessens the number of points of contact of the shaft or spools with the material, since each strip of material makes contact with the corresponding spool (or shaft portion) but twice during each revolution. By thus lessening the points of contact even rolling of the material upon the spool like portions of the shaft is assured. In addition this construction is less costly than others mentioned.

As was stated hereinabove, this invention is adapted for use with a great many different materials, amongst these being openwork materials, such as lace. In order to guide lace strips in the proper position on the spools or rollers 50, prongs 78 may be provided, as shown in Figs. 33 and 34. These prongs simply enter the space in the lace and guide it but do not damage it in any way.

Regardless of the material used for the strips, the form of shaft, or other variations which have been described, it may at times be desirable to adjust the length of the strips 11 so that the lower control member 17 will be horizontal. This adjustment may be necessary at the time of installation or may be made necessary thereafter due to inadvertent wetting and consequent shrinkage of the material. In Fig. 35 one form of adjustment device is illustrated. In this form a bar 80 extends transversely of the strip 11. This bar has turned over at its ends ears 82, between which a rod 83 extends. Mounted on this rod 83 is a plate 85 having a lower serrated edge which is adapted to grip the fabric strip 11 and hold it against the bar 80. The plate 85 is forced against the strip 11 by means of the spiral springs 84, Fig. 38. One end of each spring is bent to press against the plate while the other end presses against the bar 80 near the end thereof. The bars 80 are held downwardly by means of elastic cords 41 fixed in the bars 33 and 34, as has been described. When this adjustment means is used a weight 81 is inserted in a loop or pocket at the lower edge of each strip 11. It will be seen that if any strip should shrink it is only necessary to rotate plate 85 about its axis, thus removing the serrated edge from the strip 11 and permitting the lower control member 17 to move with respect to the particular strip and adjust itself to its proper position.

Another manner of adjusting the strips 11 so that the control member 17 may lie horizontally is shown in Fig. 39 in which a rod 87 extends through a loop in the material and is held by the elastic cords 41 in position with respect to the bars 34 and 35. In this case the upper edge of the loop in strip 11 is fastened to the lower cross-bar of a buckle member 88, the material thus taking the form shown in Fig. 40, that is extending downwardly beneath the wire 87 and then upwardly behind the lower bar of the buckle between the bars and forwardly of the center bar and then rearwardly again to lie behind the upper bar of the buckle. It will be obvious that proper adjustment may be made manually to compensate for any shrinkage of the material or for any slight error in manufacture.

Another form of adjustment means is shown in Fig. 41. In this form the cross-bar 40 is connected to the bar 33 or 34 by means of a beaded metallic cord such as the pull cords commonly used on electric lighting fixtures. This cord being adapted to enter a slot in the top of the bar 40 between the ball portions of the cord so that the bar is held downwardly by the wire like portion of the cord. In a similar manner the lower end of the cord is inserted in a slot in the inner edge of the bar 33 or 34.

In some instances it is desirable to split the lower control member 17 and to pivot the two portions thereof at their outer edges so that the meeting edges may be raised through arcs of a circle to form a blind in which the strips are draped from the shaft to a point on the side of the window, thus giving the effect of a draped curtain. Such an arrangement is shown in Figs. 42 to 51. In Fig. 42 the blind is shown in its normal position, that is with the pivoted members lowered and with the blind fully lowered and open.

In Fig. 44 the same arrangement is shown with the pivoted members raised to their greatest extent and the strips 11 draped from the upper end of the pivoted members to their respective rollers. As was stated above, in this instance the lower control member is split. For this reason it is necessary to guide this member for upward and downward movement when the blind is to be raised or lowered. On each side of the window frame there are fastened two tracks 95, best shown in Figs. 48 and 49. On these tracks members 94 having forked portions are adapted to slide. Members 94 are joined by a pin 93 which extends through a bore in the center thereof as well as through a bore in a cylindrical portion formed on the end of the bar 32. The bars 32 are extended for a short distance only and support at their opposite ends the end members 43 of a parallelogram similar to that previously described and which comprises the cross-bars 44 and 45. Since the right and left hand bars 44 and 45 abut each other it will be obvious that when both bars are in their lowered position and either bar 45 is manipulated, it will cause the bar 45 on the opposite side to move in the same direction so that both halves of the parallelogram will act together and the entire blind will be open or closed at the bottom as desired. Due to this construction the blind may be raised or lowered and may be opened or closed in exactly the same manner as has been previously described.

In addition, due to the split construction, it will be possible to pivot either half of the lower control member 17 about the pivot point formed by the pin 93 to raise the lower portion of the strip and form the desired drape. For the purpose of raising the halves of the lower control member simultaneously, cords 92, Figs. 42 and 43, are provided. These cords are fastened to the inner ends of bars 44 and 45 and extend upwardly through bridle rings 91 fixed to the ends of the strips 11 and thence through pulleys 97. At the right hand side above the pulley 97 the cords on the two sides of the strips are joined together and the single cord extends upwardly, passing over a pulley 98 and thence over a pulley 99 at the upper left hand corner of the window frame and down to the handle 100. At the left hand side the two cords 92 are likewise joined together above the pulley 97 and the single cord formed therefrom is passed over a pulley 101 at the upper left hand corner of the window frame and thence extends downwardly, joining with the cord from the other side and being thus connected to the handle 100. The handle 100 is weighted to serve as a counterbalance for the weight of the two portions of the control member 17. It will be seen that manipulation of the handle 100 will cause the two halves of the member 17 to pivot about pins 93 and cause stiffened portions of the strips 11 to fall inwardly as the corresponding control members rise. As these stiffened portions fall inwardly they cause the flexible portion of the material to drop over the end of the control members so that loops are formed, these loops being progressively larger towards the center of the blind. The manner of forming such loops is illustrated in Fig. 43, which shows the condition existing when the left half of the control member is raised through a small angle. As is best shown in Fig. 45, a pair of bridle rings 91 is fixed to the edges of each strip 11, and as shown in Figs. 42 and 43 these rings are arranged along a line which extends between the first pulley 97 and the end of the corresponding half of the control member.

Figs. 50 and 51 show a slight modification of the structure just described in which the bridle rings are dispensed with and the stiffening of the lower portion of the strips 11 is relied upon to cause a proper draped effect to occur. Aside from the difference mentioned, the showing in Figs. 50 and 51 is identical with that of Figs. 42 through 49, and therefore no further description will be given.

While I have described preferred embodiments of my invention, it is understood that the principles involved could be applied in many different forms and, therefore, I do not wish to be limited to the above description. No limitation is therefore to be implied and the appended claims are to determine the scope of my invention.

What is claimed is:

1. In a Venetian blind structure the combination of a rotatable shaft, a plurality of fabric strips suspended therefrom, forming said blind, said strips being rotatable about their vertical axes and spaced along said shaft to overlap each other when rotated into a plane parallel with the vertical plane including the axis of the shaft, means for suspending said strips from said shaft comprising tapes which when the shaft is rotated to place the blind in its lowest position lie, at the point of juncture with their respective strips, in vertical planes perpendicular to said vertical plane.

2. In a Venetian blind structure the combination of a rotatable shaft, a plurality of fabric strips suspended therefrom to form said blind, said strips being rotatable about their vertical axes and spaced along said shaft to overlap each other when rotated into a plane parallel with the vertical plane including the axis of the shaft, means for suspending said strips from said shaft comprising tapes which when the shaft is rotated to place the blind at its lowest position lie, at the point of juncture with their respective strips, in planes perpendicular to said vertical plane, and manual means for rotating said shaft to raise said blind, the first ninety degree angle of rotation causing the blind to rise slightly from its lowest position and causing said tapes to form folds whereby the tapes at the points of juncture with the strips are caused to rotate through substantially ninety degrees as the shaft rotates thereby closing the blind.

3. In a Venetian blind structure the combination of a rotatable shaft, a plurality of fabric strips suspended therefrom to form said blind, said strips being rotatable about their vertical axes and spaced along said shaft to overlap each other when rotated into a plane parallel with the vertical plane including the axis of the shaft, means for suspending said strips from said shaft comprising tapes which when the shaft is rotated to place the blind in its lowest position lie, at the point of juncture with their respective strips, in planes perpendicular to said vertical plane, manual means for rotating said shaft to raise said blind, the first ninety degree angle of rotation causing the blind to rise slightly from its lowest position and causing said tapes to form folds whereby the tapes at the point of juncture with the strips are caused to rotate through substantially ninety degrees as the shaft rotates, thereby closing the blind, the continued operation of said shaft rotating means causing said shaft to act as a roller upon which said strips are rolled to raise said blind.

4. In a device of the class described, a rotatable shaft, tapes attached thereto at spaced points along the length thereof, said tapes being attached to said shaft in pairs, each tape being attached on a line parallel to the shaft axis, the tapes of each pair being twisted in opposite directions so that the tape ends lie perpendicular to a vertical plane including the axis of the shaft, and fabric blind strips attached one to each pair of said tape ends to form a blind having blind strips extending vertically of the window opening.

5. In a device of the class described, in combination, a rotatable shaft, tapes attached thereto at spaced points along the length thereof, said tapes being attached to said shaft in pairs each tape being attached on a line parallel to the shaft axis, the tapes of each pair at their other ends being joined to a blind strip, the lengths and points of attachment being so chosen that a triangular figure comprising the tapes and a line joining the tapes is formed, the two tapes thereby equally supporting the blind strips, and means for rotating said shaft to cause said blind strip to be supported entirely by that one of the pair of tapes which is attached to the shaft on the side which is first elevated by such rotation.

6. In a device of the class described, a rotatable shaft, tapes attached thereto at spaced points along the lengths thereof, said tapes being attached to said shaft in pairs, each tape being attached on a line parallel to the shaft axis, the tapes of each pair being twisted in opposite directions so that the tape ends lie perpendicular to a vertical plane including the axis of the shaft, fabric blind strips attached to said tape ends to form a blind having blind strips extending vertically of the window opening, and means to rotate said shaft to cause folds to form in one of each of said pairs of tapes thus causing rotation of said strips upon their longitudinal axes.

7. In a device of the class described, a rotatable shaft, tapes attached thereto at spaced points along the length thereof, said tapes being attached to said shaft in pairs, each tape being attached on a line parallel to the shaft axis, the tapes of each pair being twisted in opposite directions so that the tape ends lie perpendicular to a vertical plane including the axis of the shaft, fabric blind strips attached to said tape ends to form a blind having blind strips extending vertically of the window opening and means to rotate said shaft to cause folds to form in one of each of said pairs of tapes thus causing rotation of said strips upon their longitudinal axes, additional rotation of said shaft causing the blind strips to roll thereon, said tapes remaining in their folded form between the shaft and the respective blind strip.

8. In a device of the class described, a rotatable shaft, spools on said shaft, said spools having larger diameters at their centers than at their edges, a pair of tapes attached to each said spool along lines substantially parallel to the axis of the shaft, the individual tapes of each pair being twisted in opposite directions so that the tape ends lie perpendicular to a vertical plane including the axis of the shaft, and fabric blind strips attached to said tape ends, said blind strips being of a width greater than the distance between the centers of said spools.

9. In a device of the class described, a rotatable shaft, spools on said shaft, said spools having larger diameters at their centers than at their edges, a pair of tapes attached to each said spool along lines substantially parallel to the axis of the shaft, the individual tapes of each pair being twisted in opposite directions so that the tape ends lie perpendicular to a vertical plane including the axis of the shaft, fabric blind strips attached to said tape ends, said blind strips being of a width greater than the distance between the centers of said spools, and means to rotate said shaft and spools to cause said tape ends and strips to assume positions substantially parallel to said plane and to thereafter wind upon said spools with the overlapping portions of said strips between said raised centers, the bearing surface for such winding being at the said raised centers.

10. In a device of the class described, a rotatable shaft, tapes attached thereto at spaced points along said shaft, the center lines of said tapes being parallel to the axis of the shaft and the lines of attachment to said shaft being along a circumference thereof, fabric blind strips suspended from said shaft by said tapes, said tapes when the blind is fully lowered having a right angle at the point of attachment to said shaft whereby the strips lie in vertical planes at right angles to the vertical plane including the shaft.

11. In a device of the class described, a rotatable shaft, tapes attached thereto at spaced points along said shaft, the center lines of said tapes being parallel to the axis of the shaft and the line of attachment to said shaft being along a circumference thereof, fabric blind strips suspended from said shaft by said tapes, said tapes when the blind is fully lowered having a right angle at the point of attachment to said shaft whereby the strips lie at right angles to the vertical plane including the shaft, and means to rotate said shaft to cause said right angle fold to be displaced by a forty-five degree fold across the tape whereby the strips are caused to assume a position parallel to said plane.

12. In a device of the class described, a rotatable shaft, tapes attached thereto at spaced points along said shaft, the center lines of said tapes being parallel to the axis of the shaft and the line of attachment to said shaft being along a circumference thereof, fabric blind strips suspended from said shaft by said tapes, said tapes when the blind is fully lowered having a right angle at the point of attachment to said shaft whereby the strips lie at right angles to the vertical plane including the shaft, and means to rotate said shaft to cause said right angle fold to be displaced by a forty-five degree fold across the tape whereby the strips are caused to assume a position parallel to the said plane, additional rotation of the shaft causing the blind strips to roll thereon, said tapes remaining in their folded form between the shaft and the strips.

13. In a device of the class described, a rotatable shaft, spools on said shaft, said spools having larger diameters at their centers than at their edges, a tape attached to each said spool, the center line of said tape being parallel to the axis of the spool and the line of attachment being along the circumference of the spool and displaced substantially half the tape width from the spool center, fabric strips suspended from said spools by said tapes, said tapes when the blind is lowered forming a right angle between the portion attached to the spool and the portion attached to the strip.

14. In a device of the class described, a rotatable shaft, spools on said shaft, said spools having larger diameters at their centers than at their edges, a tape attached to each said spool the center line of said tape being parallel to the axis of the spool and the line of attachment being along a circumference of the spool and displaced substantially half the tape width from the spool center, fabric strips suspended from said spools by said tapes, said tapes when the blind is lowered forming a right angle between the portion attached to the spool and the portion attached to the strip, and means to rotate said shaft and spools to cause said tape to form a fold across itself at a forty-five degree angle the center line of the unattached portion of the tape being thereby located on the center line of the spool and the strip being thereby rotated to a position parallel to a vertical plane including the shaft axis.

15. In a device of the class described, a rotatable shaft, spools on said shaft, said spools having larger diameters at their centers than at their edges, a tape attached to each said spool the center line of said tape being parallel to the axis of the spool and the line of attachment being along a circumference of the spool displaced substantially half the tape width from the spool center, fabric strips suspended from said spools by said tapes, said tapes when the blind is lowered forming a right angle between the portion attached to the spool and the portion attached to the strip, and means to rotate said shaft and spools to cause said tape to form a fold across itself at a forty-five degree angle the center line of the unattached portion of the tape being thereby located on the center line of the spool and the strips being thereby rotated to a position parallel to a vertical plane including the shaft axis, additional rotation of the shaft causing said strips to wind on said spools with the folds in the tape between the spools and the strips, the centers of the spools forming the bearing surfaces for such winding and the depressed portions between centers serving to accommodate the overlaping edges of the strips.

16. In a device of the class described, in combination, a rotatable shaft, a plurality of fabric strips suspended therefrom and adapted to be rotated about their vertical axes, means operable by rotation of said shaft to effect such rotation at the top of said strips, and means suspended from the bottoms of said strips and adapted to be operated to effect rotation of the bottoms of said strips.

17. In a device of the class described, in combination, a rotatable shaft, a plurality of fabric strips suspended from said shaft and adapted to be oscillated about their vertical axes and to roll upon said shaft, means operable by rotation of said shaft to effect such oscillation at the top of said strips, and means suspended from the bottom of said strips for effecting oscillation of the bottoms of said strips, said means being guided to move up and down as the strips are rolled upon and unrolled from said shaft.

18. In a device of the class described, a plurality of fabric strips suspended from a shaft, the strips lying in planes perpendicular to the vertical plane including the axis of the shaft, forming an open blind, members extending from each side of the blind to the center thereof and being suspended therefrom at the lower edges, means pivoting said members at the outer edges thereof, and means for rotating said members about said pivoting means to raise said members through an arc of a circle and form a draped blind.

19. In a device of the class described, a plurality of fabric strips suspended from a shaft, the strips normally lying in vertical planes parallel to each other and perpendicular to a vertical plane including the axis of the shaft and forming an open blind, members extending from each side of the blind to the center thereof and suspended from the strips at the lower edges thereof, pivot supports at the outer edges of said members, means for rotating said members about said pivots, and stiffening means on said strips the upper terminus of the stiffening means for the various strips lying on an arc of the circle through which the inner end of said member moves whereby as said members are raised about their pivot points the stiffened portions of the strips fall inward upon said members and the unstiffened portions form loops which drape over the members thus forming a draped blind.

20. In a device of the class described, in combination a shaft, a plurality of fabric strips suspended therefrom and adapted to be rototed about their vertical axes, means operable by rotation of said shaft to effect such rotation of the top portions of said strips, means suspended from the bottoms of said strips adapted to effect rotation of the bottom portions thereof, means operable by additional rotation of said shaft to roll said strips thereon, and means on each strip for adjusting the length of said strip to cause said bottom rotating means to remain in a predetermined position relative to said strips as the strips are rolled on and unrolled from said shaft.

21. In a device of the class described, in combination, a plurality of blind strips suspended therefrom and adapted to be rotated about their vertical axes, means operable by rotation of said shaft to effect rotation of the upper portions of said strips, means suspended from the lower edges of said strips adapted to effect rotation of the lower portions thereof, means operable by additional rotation of said shaft to roll said strips thereon, and adjusting means resiliently connecting said lower rotating means and said strips to permit of adjustment of said means to a predetermined position relative to said strips.

22. In a device of the class described, in combination, a flat shaft rotatable about a horizontal axis, a plurality of fabric strips suspended therefrom, a pair of substantially semi-cylindrical blocks fixed to the surface of each of said strips, and means to rotate said shaft to roll said strips thereupon, said blocks being thus caused to rise and lie with their flat sides against the sides of the shaft to form substantially cylindrical spools upon which further rolling of the material is effected.

23. In a device of the class described, in combination, a rotatable shaft, flexible blind strips forming a blind adapted to be rolled upon said shaft, and means suspending said strips from said shaft, said means being attached to said shaft and cooperating therewith to position the strips in vertical planes at right angles to the vertical plane including the shaft axis when the shaft is rotated to lower the blind to the maximum degree.

24. In a device of the class described, a rotatable shaft having alternate portions of a greater and lesser diameter, blind strips suspended from said greater diameter portions of said shaft, said strips overlapping each other adjacent said lesser diameter portions, and means to rotate said shaft to cause said strips to wind thereupon, said lesser diameter portions serving to accommodate said overlapping edges whereby said strips wind evenly upon said shaft.

25. In a device of the class described, in combination, a shaft rotatable about a substantially horizontal axis, a plurality of fabric strips suspended therefrom at spaced points therealong, said strips having their edges overlapping, means to rotate said shaft to roll said strips thereupon, and means on said strips to increase the effective diameter of said shaft on the center line of said strips whereby even rolling of the strips upon the shaft is assured.

26. In a device of the class described, in combination, a shaft rotatable about a substantially horizontal axis, a plurality of fabric strips suspended therefrom at spaced points therealong, means to rotate said shaft to roll said strips thereon, and means on said strips to cause variation of the effective diameter of said shaft from the center to the edges of each strip whereby even rolling of the strips upon the shaft is assured.

27. In a device of the class described, a rotatable shaft having alternate portions of lesser and greater diameter, a plurality of blind strips suspended from corresponding portions of said shaft, said strips overlapping each other adjacent corresponding portions, and means to rotate said shaft to cause said strips to wind thereupon said variations in shaft diameter serving to accommodate said overlapping edges whereby said strips wind evenly upon said shaft.

WALTER HOUMÈRE.